United States Patent Office 2,990,137
Patented June 27, 1961

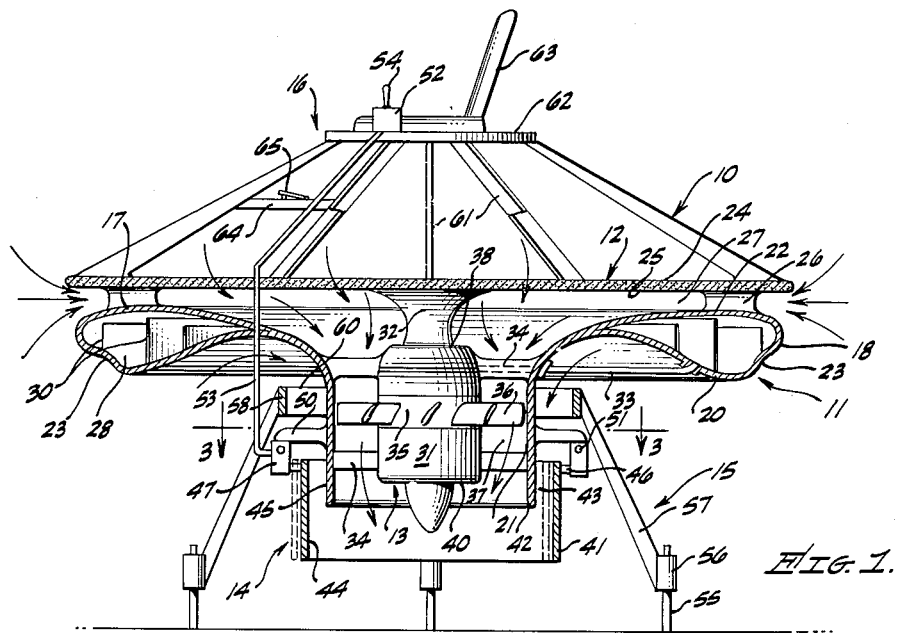

2,990,137
AIRCRAFT AND LIFT-PROPULSION MEANS THEREFOR
William M. Willis, 17114 Parthenia St., Northridge, Calif., assignor of thirty-three and one-third percent to George L. Lentz, Phoenix, Ariz., and of thirty-three and one-third percent to Myron E. Nardon, Alhambra, Calif.
Filed Apr. 11, 1957, Ser. No. 652,278
3 Claims. (Cl. 244—12)

This invention relates generally to an aircraft and to a lift and propulsion means for such aircraft.

For contemporary travel and transportation purposes, it has been found desirable to employ vertical rising aircraft of various types. Heretofore, such aircraft have taken the form of helicopters, employing single or multiple rotors, convertible types of vehicles designed for vertical ascent and descent and horizontal operation and ducted fan type arrangements. In several of these instances, it has been the goal to provide such aircraft with lift and propulsion mechanisms sufficient to transport one or a very few individuals with a minimum of machinery. Additionally, it has been the goal to provide a lift and propulsion mechanism enabling a vehicle to become airborne within a minimum time after starting and in which the propulsion mechanisms are arranged in a manner to eliminate contact of portions thereof with objects such as trees and the like.

Furthermore, it is desirable that the propulsion mechanisms in aircraft of this type be arranged and disposed in such a manner as to reduce the possibility of damage thereto by foreign objects or birds and to avoid the possibilities of injury to service or operating personnel. It is also desirable to provide a lift and propulsion mechanism wherein excessive noise is reduced and wherein excessive dust disturbance is avoided, thus to reduce detection of the apparatus when used in military applications.

In order that the most important desirable characteristics of an apparatus of this type may be obtained, it is absolutely necessary that the lift and propulsion mechanism be as sufficient as possible, thus to reduce the necessity for large size and heavy machinery. Optimum efficiency enables a low silhouette structure, lightweight mechanism facilitating transportation of the aircraft and relatively a small-sized structure commensurate with the payload possibilities. Additionally, adequate simplified control structures serve to reduce size and weight characteristics.

In vertically rising aircraft, it has been the usual practice to employ rotating blade forms and mechanism to drive such blade forms. The action of rotating blades and the lift producing effects thereof are well-known, a pressure differential being established across the blades and in a direction to enable such lift. Additionally, propulsion mechanisms have been known wherein an airflow is created over a surface, thereby to reduce air pressure at the surface in accordance with an associated increase in velocity over the surface, thus to produce a lift and/or propulsion characteristics. However, devices of this type present serious disadvantages inasmuch as it has heretofore been impractical, and in some cases impossible, to confine high velocity airflow over and in close approximation to a surface. Accordingly, this type of propulsion means has been relatively inefficient even when compared with rotating or moving blade forms of the types normally employed in helicopters and other types of conventional contemporary aircraft.

It is accordingly a principal object of the present invention to provide a novel air vehicle including a novel lift and propulsion means therefor.

It is another important object of the invention to provide a novel propulsion and lift means for aircraft to enable vertical operation thereof as well as lateral controlled movement.

It is a further object of the invention to provide a novel lift and propulsion mechanism wherein high velocity airflow is established over a relatively stationary surface, means being provided to confine the airflow in close approximation to such surface.

Still another object of the invention is to provide a lift and propulsion mechanism that is simple in design, extremely efficient in operation, reliable in use and relatively inexpensive in manufacture.

A further object of the invention is to provide a vertically rising aircraft and propulsion and lift means therefor wherein efficient means are provided to confine the airflow in close approximation to a surface of the aircraft.

Still another object of the invention is to provide a lift and propulsion mechanism that is simple in design, extremely efficient in operation, reliable in use and relatively inexpensive in manufacture.

A still further object of the invention is to provide a vertically rising aircraft and propulsion and lift means therefor wherein efficient means are provided for transportation of an adequate payload within a range and at speeds commensurate with normal military requirements.

A further object of the invention is to provide a novel aircraft mechanism and propulsion means therefor wherein such aircraft mechanism presents a relatively low silhouette, is simple to operate, has control characteristics enabling accurate air maneuverability and hovering and which is of such a size and weight as to enable efficient use thereof, transportation to a point of use, storage and like activities.

It is also another important object of the invention to provide a platform type of vertically rising aircraft wherein the lift and propulsion system is disposed beneath the platform whereby to eliminate problems connected with exposed propulsion mechanisms and in which at least one crew member in addition to a pilot may be carried, together with adequate armament.

Other and further important objects of the invention will become apparent from the disclosures in the following detailed specification, appended claims and accompanying drawings, wherein:

FIGURE 1 is a partially diagrammatic, transverse sectional view through an aircraft employing the present lift and propulsion system;

FIG. 2 is an enlarged fragmentary, partially diagrammatic, sectional view illustrating the principle of operation of the present lift and propulsion system;

FIG. 3 is a transverse sectional view through the propulsion and control portions of the present aircraft, as taken substantially as indicated by line 3—3, FIG. 1; and FIG. 4 is a fragmentary sectional exaggerated diagrammatic view illustrating an alternative control system for the present type of aircraft.

With reference to the drawings, one form of vehicle of this invention is shown as indicated generally at 10. The vehicle includes generally an annular airfoil structure 11, a platform 12, an engine arrangement 13, control mechanism 14, landing gear 15 and pilot and/or payload support structure 16.

As shown primarily in FIGS. 1 and 2, the normally horizontally disposed airfoil structure 11 comprises an upper portion 17, an outer peripheral contoured portion 18 and a lower portion 20. The portions 17 and 20 extend radially inwardly and converge into a shroud portion 21. It is to be noted that the portion 17 has an upper surface 22 that is contoured and that the outer peripheral portion 18 has an annular groove 23 in the area thereof adjacent the lower portion 20, the purpose of which to be hereinafter more fully described.

The platform 12 is a generally circular member of a finite thickness and having an upper surface 24 and a lower surface 25. The platform 12 is supported in parallel spaced relationship with respect to the airfoil structure 11 by means of a plurality of vertically disposed struts 26 that extend between the upper surface 22 of the structure 11 and the lower surface 25 of the platform 12. Thus an annular passageway 27 is defined between the lower surface 25 of the platform 12 and the upper surface 22 of the structure 11.

As shown in FIG. 1, the various integral portions 17, 18 and 20 of the airfoil structure 11 serve to enclose an annular fuel tank 28 in which a plurality of annular baffles 30 are disposed. The engine arrangement 13 may comprise any suitable type of power plant such as, for example, a gas turbine 31. In accordance with usual practices, the turbine 31 is provided with the usual compressor and turbine rotor (not shown) and may be supported by means of a column 32 from the lower surface 25 of the platform 12. Fuel from the tank 28 is delivered to the turbine 31 by means of a fuel line 33 which extends through one of a plurality of supporting struts 34 that are disposed between the outer case of the turbine 31 and the shroud portion 21 of the airfoil structure 11. The turbine 31 has a rotor 35 that is driven thereby, the outer periphery of which is provided with a plurality of impeller blades 36. The impeller blades are disposed in a discharge passageway 37 formed between the outer periphery of the casing of the turbine 31 and the shroud 21. Combustion air for the turbine is drawn therein through an intake 38 with exhaust products being delivered from an exhaust 40 of the turbine 31.

The mechanism thus far defined includes the basic components of the present invention as to enable the desired lift and propulsion means for an aircraft.

As shown in FIG. 2, the platform 12 is constructed from a suitable porous medium as for example, from a sintered material whereby to provide a plurality of finite passages therethrough. These passages extend throughout the material with a portion communicating between the sides 24 and 25 and are in the form of orifices defined between various particles of the platform material. The material of the platform may thereby be defined as enabling a non-fluid pressure supporting structure, as will be pointed out in detail hereinafter. The turbine 31 and the impeller blades 36 driven thereby serve to produce a high velocity flow of air radially inwardly through the annular passageway 27 between the platform 12 and the airfoil structure 11, thereafter to discharge this air through the annular discharge passage 37 about the turbine 31. The high velocity of the air passing through the annular passageway 27 and over the surfaces 25 and 22 of the platform 12 and airfoil structure 11, respectively, serves substantially aerodynamically to choke flow of air through the orifices in the material of the platform 12. It may thus be seen that while little or no fluid flow will be experienced through the platform 12, a considerable fluid flow will be induced radially inwardly through the passageway 27, with the surface 25 of the platform 12 serving to confine the high velocity airflow while still not supporting fluid pressure. As it is well known that pressure on a pressure supporting surface will be reduced as velocity flow thereover is increased, a pressure differential is thereby created across the airfoil structure 11 to create a lift component in an upward direction. Specifically, this may thus be expressed as follows:

$$\Delta P = \frac{TP}{TSP} = \Delta P \text{ ratio}$$

where TP is total pressure and TSP is static pressure.

A practical example may be indicated for the present structure when air flow through the passageway 27 in the range of approximately Mach .6. This magnitude of fluid flow will create a differential pressure ratio of approximately 1 to 1.27, thus adequately demonstrating the high efficiency of the present structure. This efficiency has been found to be as high as 70%.

It is to be noted that the radially inward contour of the surface 22 of the airfoil structure portion 17 serves to provide a gradual pressure differential as the radially inward flow is accomplished.

In order that lateral control of the mechanism may be accomplished, the control structure 14 includes an annular cylindrical ring 41 that is disposed about a free end 42 of the shroud portion 21 of the airfoil structure 11, an annular passageway 43 being defined between an inner surface 44 of the ring 41 and an outer surface 45 of the portion 21. Outflow of air and exhaust products from the passage 37 flows outwardly through a portion of the ring 41 and serves to aspirate flow of air from the lower surface of the airfoil structure 11. When the ring 41 is disposed in concentric relationship to the portion 21, a circumferentially equal flow of air will be effected. However, by laterally shifting the ring 41 with respect to the portion 21, a circumferentially different airflow pattern will be established through the aspirator ring 41 and passageway 43, thus to move the air stagnation point in the area of the annular groove 23 in such a manner as to permit a greater pressure differential across the airfoil structure 11 in specific areas thereof and greater on one lateral side than on another. Lateral control and movement of the aircraft will thus result by a slight tipping action of the entire aircraft.

As shown in FIG. 1, the ring 41 is supported on radially disposed shafts 46 that extend from a plurality of actuators 47. The actuators 47 are shown as being four in number, for example, spaced circumferentially and supported on struts 50 that are in turn connected to the outer surface 45 of the airfoil structure portion 21. Suitable pivotal connections between the actuators 47 and the struts 50 are provided to enable cooperative operation of the actuators. Each of the several actuators 47 is connected by way of an annular conduit 51, through which multiple control circuits may extend, to a position selector 52 by way of a suitable conduit 53. The selector 52 is provided with a control handle 54, the structure being such that when the handle 54 is moved universally, one or more of the actuators 47 will be differentially energized whereby to position the ring 41 eccentrically with respect to the portion 41 and as shown, for example, by the dotted lines in FIGS. 1 and 3. Control mechanism of this type and for remote servo positioning is conventional and specific details thereof form no part of the present invention.

As shown in FIG. 1, the landing gear may be of any suitable type as, for example, a plurality of rods 55 that are mounted in suitable shock mounts 56 and supported on arms 57 which extend from a supporting ring 58 that is in turn mounted on the other surface 45 of the airfoil structure portion 21 and retained in position by means of struts 60. A landing mechanism of this type enables suitable vertical landings and provides compensation for various irregular terrain conditions. In this connection, it is to be recognized that any suitable type of landing gear may be used with the present aircraft without departing from the spirit and scope of the invention.

In order that a pilot and/or additional passengers or payload may be carried by the present air vehicle, the structure 16 is provided and includes a plurality of supports 61 that extend upwardly from the upper surface 24 of the platform 12 and terminate at a disc 62. The disc 62 may serve to support a seat 63. Additionally, a footrest 64 may be provided which may also carry suitable foot-operated controls 65. While the present device is shown as being arranged to accommodate only a single occupant, namely, the pilot, it is to be understood that the arrangement of the structure 16 may be varied over a wide range, thus to accommodate a reasonable number of passengers commensurate with the size of the platform and other mechanism of the aircraft and that the pilot area may be enclosed by suitable structure, if desired, without departing from the spirit and scope of the invention.

In view of the foregoing description, it may thus be seen that an aircraft vehicle has been provided including a novel lift and propulsion means therefor, together with suitable controls for lateral movement of the vehicle. The rate of vertical movement may be controlled by varying the flow characteristics through the annular passageway 27 as by several well known methods such as, for example, controlling the speed of the turbine 31, varying the pitch of the impeller blades 36, bleed-off ducts from the passageway 27 or suitable spoiler arrangements. It is further to be understood that the aircraft and propulsion mechanism shown in FIGS. 1, 2 and 3 is illustrated partially schematically for clarity and to provide an adequate teaching of the novel principles of this invention.

With reference to FIG. 4, it may be seen that other methods may be employed to effect control of the present aircraft in lateral movements thereof. As described hereinbefore, resultant lift is accomplished by creating a certain pressure differential across the airfoil section 11. Thus, by changing the velocity over the upper surface 22 of the airfoil section, a higher pressure at this surface will occur, resulting in a lower pressure differential and, accordingly, less lift. It may also be seen that by circumferentially varying the lift applied to various portions of the present aircraft, the device may be made to tilt, whereby to effect lateral control. As shown in FIG. 4, such a circumferential variation in lift coefficient may be accomplished by providing means by which the platform 12 may be tilted with respect to the airfoil portion 11. Such means is indicated by an actuator 70 that is carried by the upper surface 22 of the airfoil portion 11 and connected with the lower surface 25 of the platform 12. A motivating fluid may be conducted to the actuator 70 by means of a conduit 71. While the illustration in FIG. 4 is of an exaggerated nature, it may be seen that by positioning several actuators of the type shown at 70 in circumferential spaced relationship, by providing suitable pivotal mounting structure for the actuators 70 and/or the output members thereof and by controlling movement thereof in a differential manner as by use of a common multiple way valve and usual fluid return system, varying fluid velocities may be established over the airfoil section 11 and within the passage 27, thus to vary the lift coefficients on the aircraft.

Having thus described the invention and the present embodiments thereof, it is desired to emphasize the fact that many further modifications may be resorted to in a manner limited only by a just interpretation of the following claims.

I claim:
1. In an aircraft lift and propulsion apparatus, the combination of: an airfoil structure; a platform disposed in adjacent vertically above spaced relationship to said structure, opposed surfaces of said structure and said platform defining a fluid flow passage, said structure being of solid fluid pressure supporting material, said platform being of a porous non fluid pressure supporting material; and means for producing a high velocity fluid flow through said passage whereby to create a pressure differential across said airfoil structure and a force component in an upward direction.

2. In an aircraft having a propulsion apparatus, landing gear, payload facilities and control mechanism, a lift and propulsion system comprising: an annular airfoil structure, said propulsion apparatus being positioned in a central area of said structure; a circular platform disposed in spaced relationship above said structure; means for maintaining said spaced relationship, said platform being constructed from a porous, non fluid pressure supporting material, opposed surfaces of said airfoil structure and said platform defining an annular fluid flow passage; and impeller means driven by said propulsion apparatus for effecting a radially inward high velocity fluid flow through said passage and over said surfaces of said airfoil structure and said platform whereby to produce a pressure differential across said airfoil structure and a vertically upward lift component of said aircraft.

3. In an aircraft: at least one atmospherically disposed passage structure carried by said aircraft; gravitationally upper and lower walls in said passage structure, said upper wall being a circular platform of finite thickness, non-fluid pressure supporting and constructed from a porous material having a plurality of finite orifices therethrough and communicating between atmosphere and an interior of said passage structure, said lower wall having an annular airfoil configuration; and means carried by said aircraft for producing a high velocity fluid flow through said interior of said passage structure, whereby aerodynamically to choke fluid flow through said finite orifices in said upper wall, confine said fluid flow adjacent an inner surface of said lower wall and create a static pressure level on said inner surface of said lower wall that is below a static atmosphere pressure level acting upon an outer surface of said lower wall.

References Cited in the file of this patent
UNITED STATES PATENTS

| | | |
|---|---|---|
| 1,513,241 | Harding | Oct. 28, 1924 |
| 1,782,210 | Nose | Nov. 18, 1930 |
| 2,463,864 | Gibson | Mar. 8, 1949 |
| 2,718,364 | Crabtree | Oct. 20, 1955 |
| 2,801,058 | Lent | July 30, 1957 |